United States Patent [19]

Hessel

[11] Patent Number: 4,707,693
[45] Date of Patent: Nov. 17, 1987

[54] THROUGH-TRAFFIC PRIORITY PROTOCOL IN A COMMUNICATIONS SYSTEM

[75] Inventor: Steven R. Hessel, Campbell, Calif.

[73] Assignee: Hewlett-Packard Company, Palo Alto, Calif.

[21] Appl. No.: 620,236

[22] Filed: Jun. 13, 1984

[51] Int. Cl.⁴ .......................... H04Q 5/00; H04J 3/00; H04J 3/24
[52] U.S. Cl. ............................. 340/825.51; 340/825.5; 370/85; 370/94; 370/86
[58] Field of Search ........... 340/825.51, 825.5, 825.05; 370/85, 86, 89, 94; 364/200

[56] References Cited

U.S. PATENT DOCUMENTS

| 4,063,220 | 12/1977 | Metcalfe et al. | 340/825.5 |
| 4,173,007 | 10/1979 | McKeighen et al. | 73/609 |
| 4,432,088 | 2/1984 | Frankel | 370/85 |
| 4,500,987 | 2/1985 | Hasegawa | 340/825.5 |
| 4,542,380 | 9/1985 | Beckner et al. | 340/825.5 |
| 4,561,092 | 12/1985 | Shaver | 340/825.05 |

OTHER PUBLICATIONS

"An Introduction to Local Area Networks", Clark et al., Proceedings of the I.E.E.E., vol. 66, No. 11, 11/78, pp. 1500–1502.

Primary Examiner—Ulysses Weldon
Assistant Examiner—Ralph E. Smith
Attorney, Agent, or Firm—Edward Y. Wong; Paul L. Hickman

[57] ABSTRACT

A method and an apparatus for communications systems provide priority to packets entering a communications node from a network to enable transmission of these packets in an orderly and efficient fashion. By defining a through-traffic preemptive priority mode, local packets are held in abeyance until packets which are already on the network and detected at the communications node have been routed through the node. Then the local packets are allowed to be transmitted from the node. And by defining a through-traffic priority mode, the local packet once started is completely transmitted before the network packets entering the communications node are allowed to continue through the system.

2 Claims, 3 Drawing Figures

THROUGH-TRAFFIC PRIORITY PROTOCOL IN A COMMUNICATIONS SYSTEM

BACKGROUND AND SUMMARY OF THE INVENTION

In the prior art, data communications networks have allowed commuciation between user terminals, computers, and other peripheral equipment. As computer capability increase, a single computer is made to serve many users; and as computer cost decreases, computers are increasingly widely dispersed to serve the individual users. While computer costs have been falling rapidly most peripheral equipment costs have been falling more slowly. One way to minimize the expense of this equipment is to share it. Consequently, a need for more efficient ways to share the relatively expensive peripheral equipment increases. And as more and more inexpensive computers proliferate and are dispersed, the information flowing to and from these computers also becomes more widely dispersed. As a result, a parallel need to access information remotely located increases. The net result is a corresponding increase in numbers and complexity of data communications networks.

In these communications networks, data are handled either by centralized control or distributed control. The simpler of the two approaches in handling data is by centralized control. However, because a single controller dictates the flow of data in the network, it can become a bottleneck if it has an inadequate capacity to handle all the data. Worse yet, it can cause the entire data communications network to fail if it itself fails. For these reasons, network control is often distributed to the remote information points, or nodes.

In general, two generic distributed control tecniques are used. One is generally referred to as a circuit switching technique, while the other technique is generally referred to as a packet switching technique. Circuit switching techniques can be analogized to telephone network switching, which for short and bursty communications typical in computer applications requires a high overhead in terms of capacity. For short bursts of communications, the time required to establish the connection can be very large relative to the time of actual transmission. However, if the connection is maintained for a longer period of time it is unused and wasted during the large fraction of idle time between bursts. On the other hand, packet switching can be analogized to letter handling by the postal system, except that the letters are computer data packets sorted and transmitted very quickly by increasingly inexpensive electronics. Short communications can be carried efficiently in a single data packet, and longer communications can be handled with a series of packets, none of which occupy communications resources during the frequent idle periods between bursts.

Accordingly, there exists a present requirement for a packet switching communications system which is efficient and reliable while requiring minimum hardware. An additional requirement to the communications system is a capacity of effecting communications between various computers and peripherals with a high probability of delivering the packet without the aid of central control. There is a further requirement to provide a communications network which is simple to produce, requires simple parts in its attachments and is generally of low complexity. One communications system proposed in the prior art to meet these requirements is disclosed in "Multipoint Data Communications System with Collision Detection," U.S. Pat. No. 4,063,220, by Metcalfe et al., herein incorporated by reference in full. The present invention provides an alternate communications system to meet these requirements.

In general, information is carried on such systems in units usually called packets. In the ensuing discussions, packets will be used to describe data which flow inseparably through a network; they may contain whole messages or fragments thereof.

In accordance with the invention the protocols control communications by viewing packets as contending for a limited resource, namely, the outbound data link to a remote node of the communications network. Contention among the packets at a node which are to use a link is resolved by assigning priorites to these contending packets. At a particular node, packets which are generated at the local computer or other local device are called "local" packets. In contrast are "network" packets: network packets are those packets generated at nodes within the network other than the local one. All local and all network packets are treated in a first-in-first-out priority order; and all network packets are given priority over all local packets.

Priority between local and network packets takes one of three forms: simple priority, preemptive priority with repeat, and preemptive priority with resume. Simple priority, or priority with no preemption, indicates that the priority rule is invoked at the end of the service by the limited resource or when no service is underway. The priority rule can be stated succinctly: once service has commenced on a job the service is always completed. Preemptive resume priority indicates that the priority rule is always in effect. The arrival of a high priority job immediately terminates a lower priority one. However, after the preempting higher priority job has been serviced the lower priority job is again serviced. The service resumes where it had stopped last time. No service is lost. Preemptive repeat priority similarly indicates that the priority rule is always in effect. However, when the partially serviced lower priority job is again serviced, all the service previously performed is lost and the job has to start again. The preferred embodiment of the invention incorporates the first two implementations of the priority rule, viz., simple priority and preemptive priority with resume.

The simple alternate communications system in accordance with the preferred embodiment of the invention defines a protocol for handling packets generated locally, viz., local packets, and those arriving at the node from the network, viz., network packets. With this protocol, network packets pass through all intervening nodes except (1) the node where they originate, viz., the source node of local node, to which they are local packets, and (2) their destination node, where they are usually removed from the network. These packets comprise through-traffic at the nodes between their source and destination.

In the through-trafic preemptive mode, a network packet entering and passing through the node takes priority over any local packet transmission in the node. The network packet entering a node is initially delayed by being routed to an input shift register. In the meanwhile, any transmission of a local packet is terminated, and a node output switch selects the output of the shift register through which the network packet is passed for transmission. Assuming receiver removal is used, if the network packet's destination is the node itself, the network packet would not be routed through and out of the node; rather the packet would be removed from the network.

By adding a delay circuit in the path of the network packet as it emerges from the input shift register, a nonpreemptive through-traffic mode can be implemented. The delay circuit functions as a holding circuit for the network packet; it delays or stores the packet or a fraction of the packet. Transmission of a local packet is first completed. Then the network packet passing through the node is allowed to proceed from the delay circuit and is transmitted into the outbound link. Again assuming receiver removal, if the network packet's destination is the node only, the network packet is not retransmitted into the network.

Several advantages in addition to simplicity are achieved with the present invention. One major advantage is that by using delay circuits such as shift registers, there is time for the transmission of the local packet to be terminated without destroying the validity of the transmitted data. In other words, preemptive repeat is not necessary. Another is that when receiver removal is used, this protocol permits the rest of the ring (typically half the ring) to carry additional traffic. This approximately doubles capacity over that of most other protocols.

Another advantage with the present invention is the ease with which the system can be expanded or extended topologically. In prior art communications networks, a protocol typically has some characteristic which limits the domain of nodes which can cooperate in communication. If the structure is a bus, the limiting characteristic may be the extend of broadcasting on the bus. If the structure is a token or slotted ring, then the limiting characteristic may be the group of nodes that actually appear on that ring. In each case, the limiting characteristic prevents a straightforward extension of a basic communications protocol to multiple structures. In the prior art, to couple multiple structures, i.e., rings or busses, usually requires complicated "bridge" functions. These bridge functions require extensive processing for each packet passing through the bridge. Because of this, such bridge functions impede and slow transmission and, sometimes, act as bottlenecks. The protocol systems in accordance with the preferred embodiment of the invention do not have this limitation of the prior art. By adding more address comparators to facilitate routing, multiple network output ports from a node can be implemented simply. By adding storage for queuing, multiple network input ports can be attached to a single node. Thus, a bridge function is realized with only a little increase in complexity, with no loss in speed, and with no change in protocol. This is possible with the preferred embodiment of the invention because the packet is entirely self contained and is independent of its surroundings. It requires no tokens or slots for permission to transmit.

DESCRIPTION OF THE PREFERRED EMBODIMENTS

The present invention is capable of handling two throughtraffic priority protocols: one preemptive and the other nonpreemptive. These will be described separately.

THROUGH-TRAFFIC PREEMPTION MODE

Figure 1:
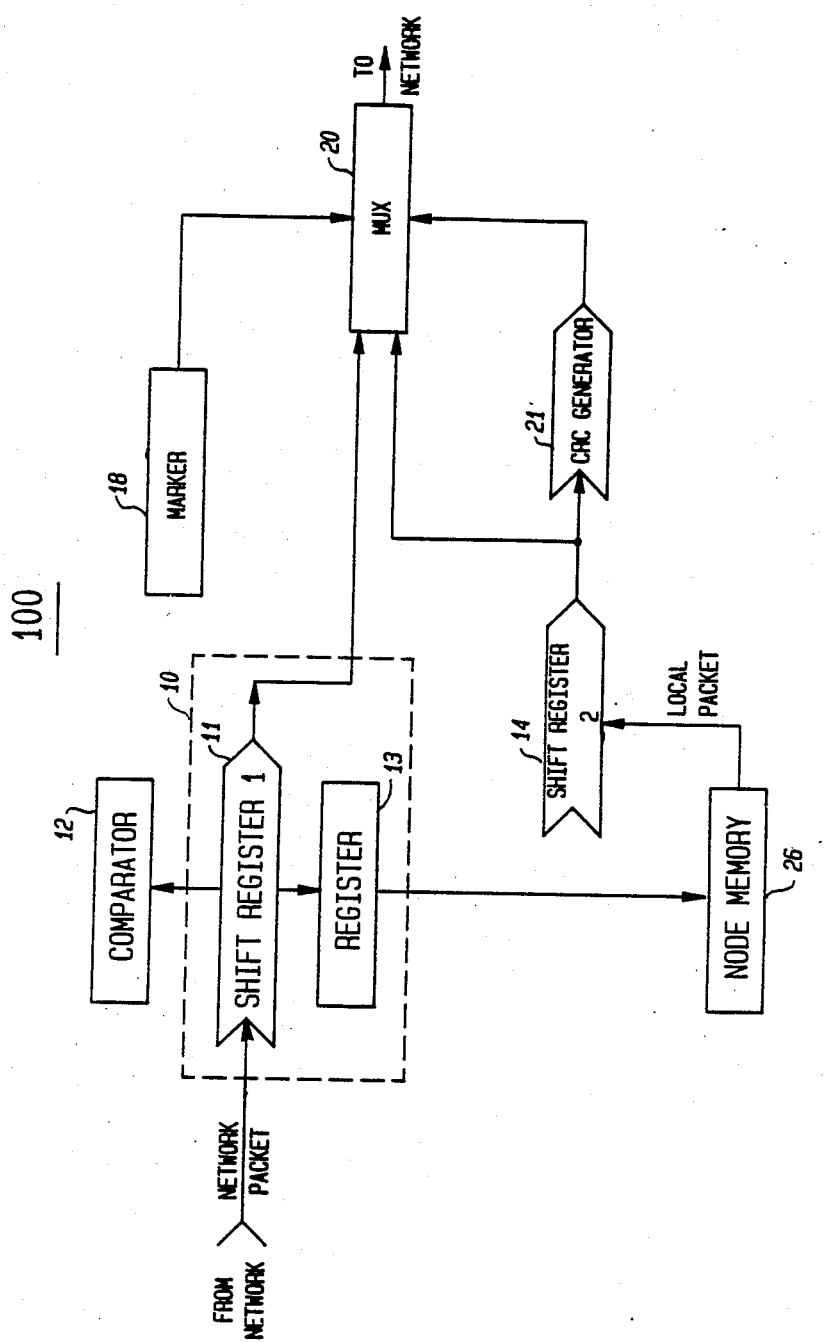
FIG. 1 shows the preferred embodiment of the invention for a through-traffic preemptive priority protocol.

In accordance with the preferred embodiment as depicted in FIG. 1, a local packet is generated by a host such as a computer attached to a node in a communications system, for example, a node 100 in a network system, and is stored in a node memory 26.

In a through-traffic preemption mode, the local packet transmission in the node 100 is preempted by a network packet passing through the node 100. Therefore before any transmission of the local packet is made in this mode, the node is examined to ascertain that a through packet from the system network is not being transmitted to the node 100. For example, the bit stream entering the left end of the shift register 11 is examined for the presence of an idle pattern. When a network packet arrives at the node 100, the network packet first enters an input shift register 11, and the address of the network packet being transmitted is compared to the node address by a comparator 12 coupled to the input shift register 11 to see if the node 100 is its destination. If not, the packet is passed through the node 100.

The shift registers 11, 14, 37 used here always perform a serialization or parallelization function. These shift registers 11, 14, 37 also introduce some fixed delay into the data path. Therefore, these devices 11, 14, 37 in delaying information also are in effect holding information.

If no packet is detected for a time long enough to guarantee that no portion of a valid packet is in the shift register 11 and if other criteria necessary for flow control as dictated by the network systen have been met, then the local packet is ready for transmission. It is then transferred as needed from the node memory 26 into the intermediate shift register 14 where it is serialized and is then routed through an output multiplexer 20 for transmission to the network. Simultaneously, a cyclic redundancy code (CRC) check sum is calculated in a CRC generator 21. When the transmission of the local packet is complete, the output multiplexer 20 selects the CRC for transmission and follows that with an appropriate end-of-transmission (EOT) pattern by an EOT pattern generator 18. Such a pattern may also be the idle pattern being continuously transmitted when no data is being transmitted.

If while the local packet is being transmitted a valid through packet from the network is detected, that is, a network packet external to the node 100 is passing into the node 100, transmission of the local packet is terminated. The output multiplexer 20 switches first to the CRC generator 21, then to the EOT pattern generator 18 to mark the end of the local packet, and finally to the output of the input shift register 11, which allows the through packet to be transmitted through and out of the node 100 to the remaining system network.

The only condition under which a network packet is not passed directly and immediately through the node 100 along with its inherent delays, for example, those which are incurred through the input shift register 11, is if the node address comparator 12 identifies the network packet as one destined for that very node 100 and for that node only. Under this condition, the output multiplexer 20 switches to the output of the EOT/idle pattern generator 18 for transmission, thus signaling subsequent nodes in the network that the network is now available. In this case the incoming network packet passes through the input shift register 11, and is latched in parallel form into a register 13 coupled to the input shift register 11. From the parallel register 13, the data is routed to the node memory 26. If the data rate of the incoming network packet is very high, the data in the network packet can be latched into wider words before storage in the node memory 26.

THROUGH-TRAFFIC PRIORITY MODE

In a through traffic priority mode, nonpreemptive priority is given to the network traffic entering the node. Thus a transmission of a locally generated packet once begun is always completed. The preferred embodiment of the invention depicted in FIG. 2 provides operation in this mode.

Figure 2:
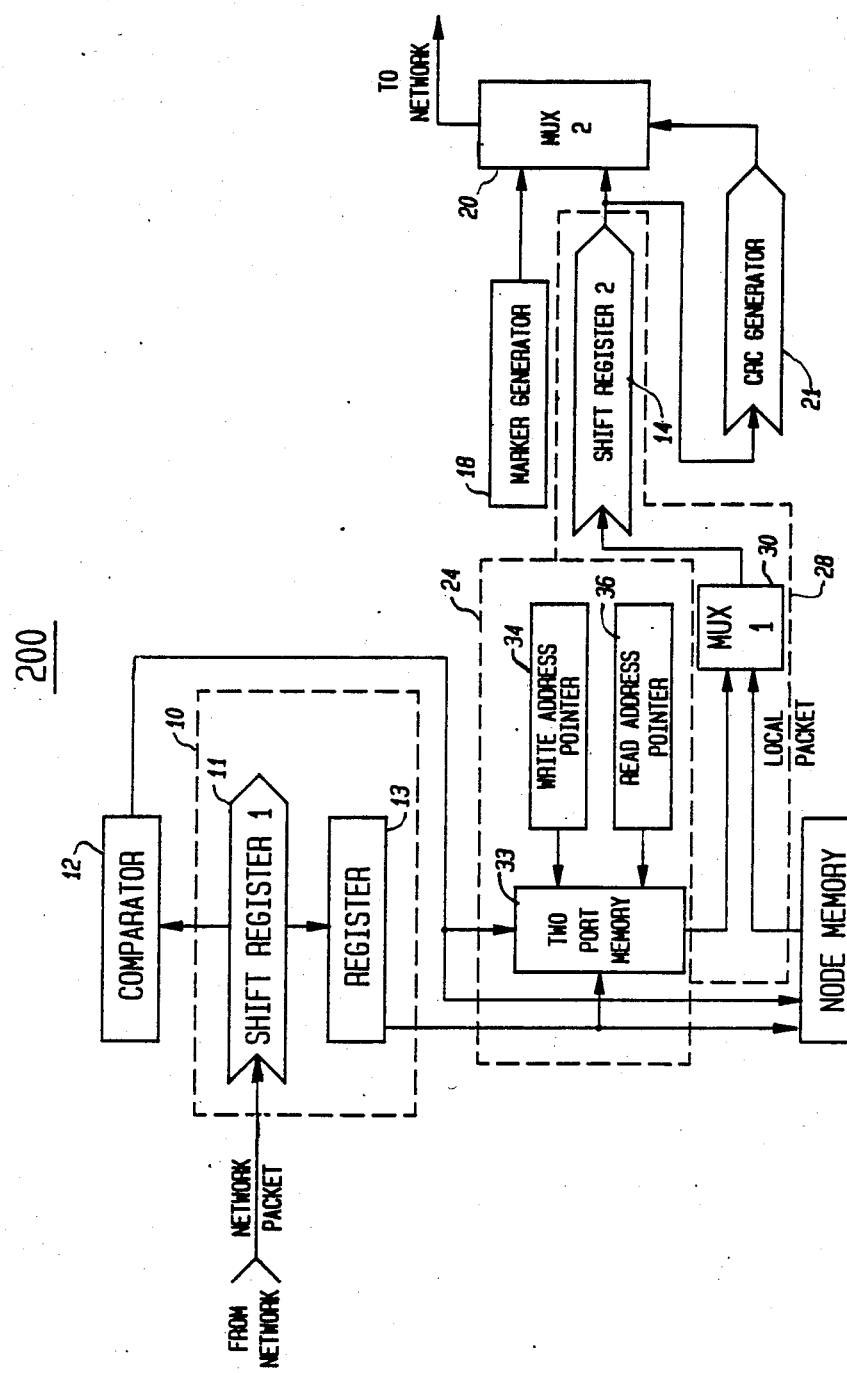
FIGS. 2 and 3 show preferred embodiments of the invention for a through-traffic priority insertion ring protocol.

As shown in FIG. 2, network packets entering the node 200 under this mode are held in abeyance in an insertable delay 24 until the local packet transmission is complete. After that time, through network packets are passed through the node 200 via an intermediate multiplexer unit 28 and an output multiplexer 20 and are transmitted again into the network. The insertable delay 24 in accordance with the preferred embodiment comprises a two-port memory 33 with read and write address pointers 34, 36. The relative values in these address pointers 34, 36 determine the currently inserted delay, and the size of the memory 33 determine the maximum insertable delay.

Specifically in this mode in accordance with the preferred embodiment, a local packet may be transmitted from the node 200 if no valid network packet is currently in the input shift register 11 enroute through the node 200 and if the insertable delay 24 in the node 200 is at a minimum, that is, read and write address pointers 34, 36 are equal. In the process, an intermediate multiplexer 30 routes the local packet to a shift register 14 for serialization before it is selectively by an output multiplexer 20 for transmission.

If in the course of transmitting the local packet, a valid through packet is detected entering the node 200, the through packet is routed to the two-port memory 33 for delay. When the local packet transmission is complete, output multiplexer 20 selects the output of a CRC generator 21 to append to the transmitted local packet and then attaches an appropriate end-of-packet marker, such as the output from an idle pattern generator 18, following the CRC. At this point, the two-port memory 33 is examined to see if it contains data, which is indicated by unequal read and write address pointers 34, 36. If it does, the output multiplexer 20 again selects the serial shift register 14 and the through packet in the two-port memory resumes transmission through the node 200.

As long as through packets keep entering the node 200 from the network, the packets are passed through the input shift register 11 and the two-port memory 33, where the packets are delayed. The two-port memory 33 creates an insertable delay the value of which is determined by the relative values in its associated write and read address pointers 34, 36. The write address pointer 34 keeps incrementing so long as data in entering the node 200, and the read address pointers 36 keeps incrementing so long as the pointers are not equal, that is, untransmitted data is still in the memory 33. In other words, by incrementing the write address pointer 34, the two-port memory 33 is essentially counting up from an initial delay. However, when no valid data is entering the node 200, the write address pointer 34 ceases to increment. The read address pointer 36 increments as data is transmitted out. This process continues until the write and read address pointers 34, 36 are equal or until valid data again enters the node 200. When the write and read address pointers 34, 36 become equal, the inserted delay 24 has reached a minimum. At this time, the output multiplexer 20 selects a marker, for example, the idle pattern, for transmission, and the mode 200 is then ready for local packet transmission again. And when network data again enters the node 200, the data is routed into and out of the two-port memory 33 at equal rates as before.

Thus, with the preferred embodiment of the invention under this mode, a network packet arriving at a node 200 incurs the delay currently inserted in the node 200 before the packet is retransmitted. However, when an address comparator 12 in the node 200 identifies the arriving packet as being destined for the current node only, the output multiplexer 20 selects the shift register 14 only if and while the write and read address pointers 34, 36 are unequal; otherwise the output multiplexer 20 selects the output of the idle pattern generator 18 for transmission and the data entering the node input shift register 11 is latched in parallel form in a register 13 as before. If the data rate is undesirably high, further parallel latching takes place. The network packet is then transferred to the node memory 26 preparatory to eventual transfer to the host.

Figure 3:
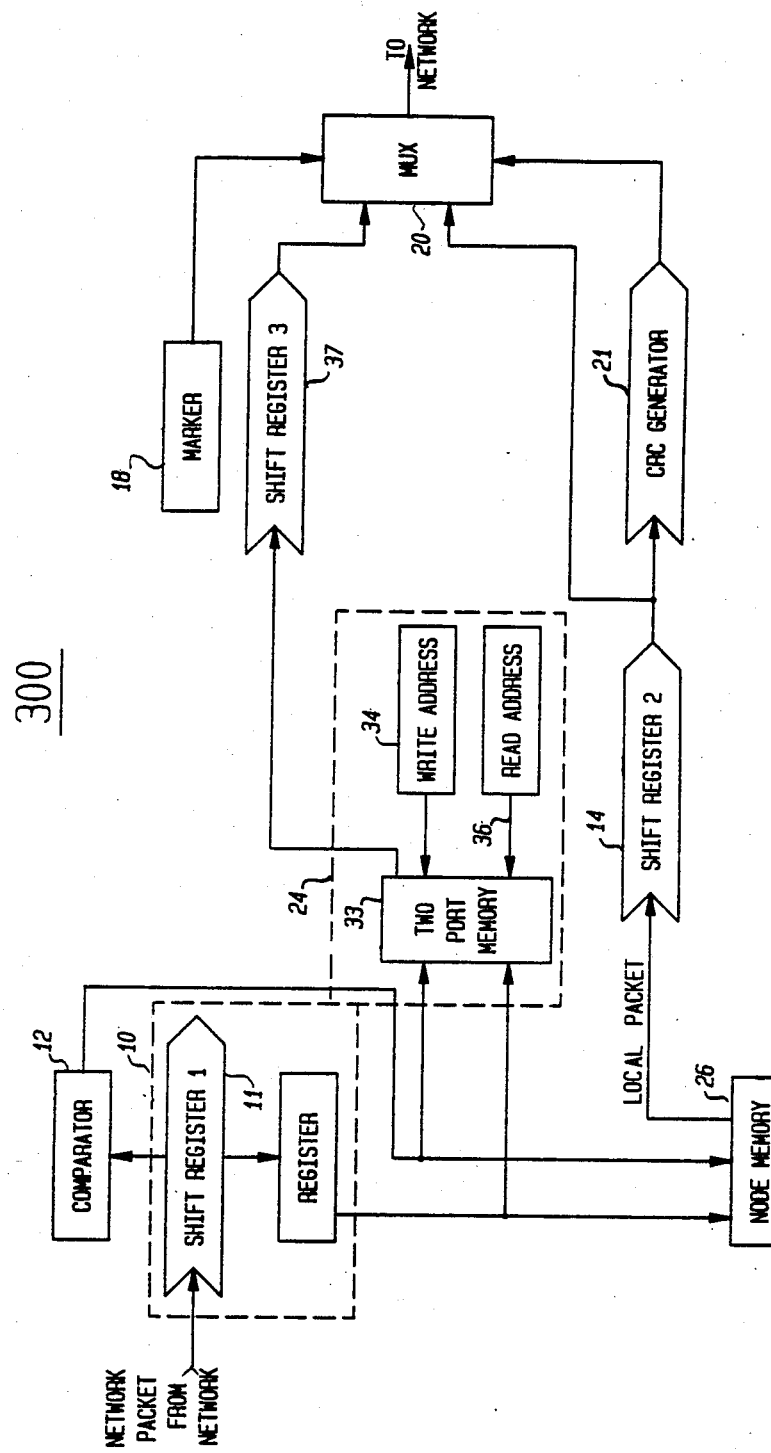

Although the preferred embodiment is described as having an intermediate multiplexer 30 for routing both the local and the external network packets, another embodiment as depicted in FIG. 3 does not require one. Instead, this communications system 300 is expanded over that of FIG. 1 by placing a two-port memory 33 between an input port 10 containing the input shift register 11 and the output multiplexer 20. Of course, the output must be reserialized by a shift register 37. In this manner, the preselectable delay associated with the insertable delay 24 described in the earlier paragraphs is included in the network packet passing through the node 300 before it is selected by the output multiplexer 20 for transmission.

I claim:
1. A communications system for receiving and retransmitting a network packet and for transmitting a local packet comprising:
    an input means for receiving and holding an entire network packet;
    a verifying means coupled to said input means for determining an absence of network packets in said communications system;
    an address comparator coupled to said input means for identifying said network packet;
    a source means for providing a local packet;
    a pattern generator for generating a marker signal;
    an output select means coupled to said input means, said source means, and said pattern generator for selectively coupling one of said network packet, said local packet, and said marker signal for transmission;
    a variable delay means interposed betweens said input means and said output select means for receiving said network packet and for delaying said network packet by a predetermined amount; and an output holding means coupled at its input to said delay means and to said source means and coupled at its held output to said output select means for selectively holding an entire network packet or an entire local packet.

2. A communications sytem for receiving and retransmitting a network packet and for transmitting a local packet comprising:

an input means for receiving and holding a network packet;

a verifying means coupled to said input means for determining an absence of network packets in said communications system;

an address comparator coupled to said input means for identifying said network packet;

a source means for providing a local packet;

a pattern generator for generating a marker signal;

an output select means coupled to said input means, said source means, and said pattern generator for selectively coupling one of said network packet, said local packet, and said marker signal for transmission;

a delay means interposed betweens said input means and said output select means for receiving said network packet and for delaying said network packet by a selectable amount; and an output holding means coupled at its input to said delay means and to said source means and coupled at its output to said output select means for selectively holding one of said network packet and said local packet, wherein said output holding means comprises an intermediate select means coupled to said delay means and to said source means for selectively coupling one of said network packet and said local packet as its selected output, and a holding means coupled at its input to said intermediate select means for holding said selected output of said intermediate select means and coupled at its output to said output select means.

* * * * *